April 19, 1932. A. G. F. KUROWSKI 1,854,338
COMBINED TYPEWRITING AND COMPUTING MACHINE
Filed June 30, 1928 2 Sheets-Sheet 1
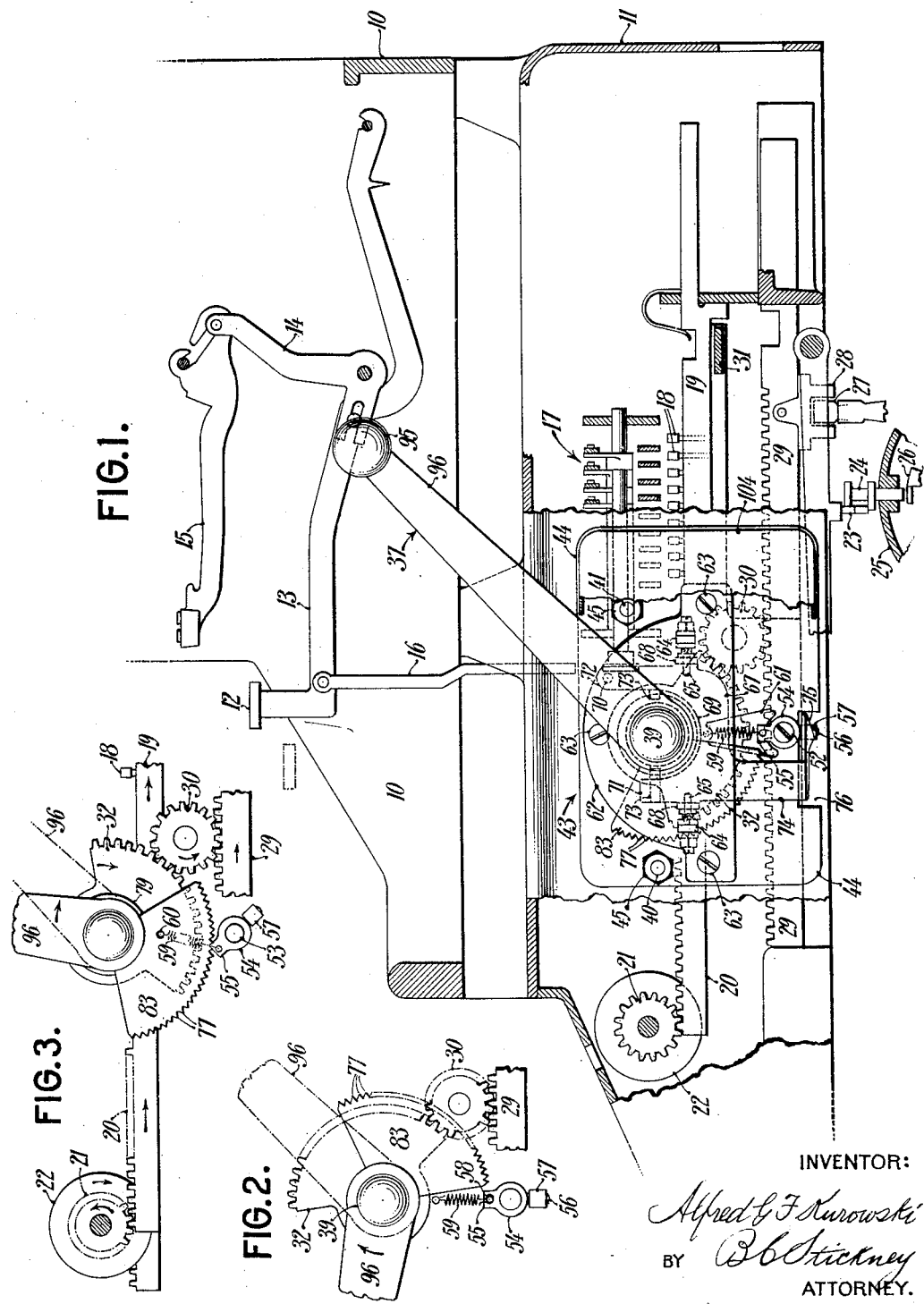
INVENTOR:
Alfred G. F. Kurowski
BY D. C. Stickney
ATTORNEY.

April 19, 1932.  A. G. F. KUROWSKI  1,854,338
COMBINED TYPEWRITING AND COMPUTING MACHINE
Filed June 30, 1928  2 Sheets-Sheet 2
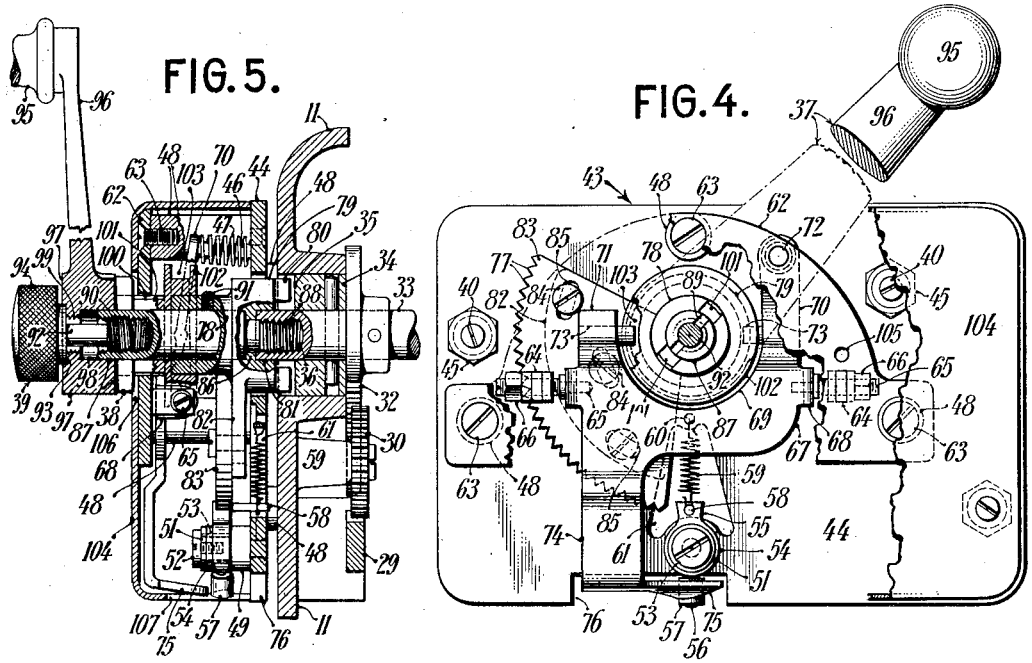
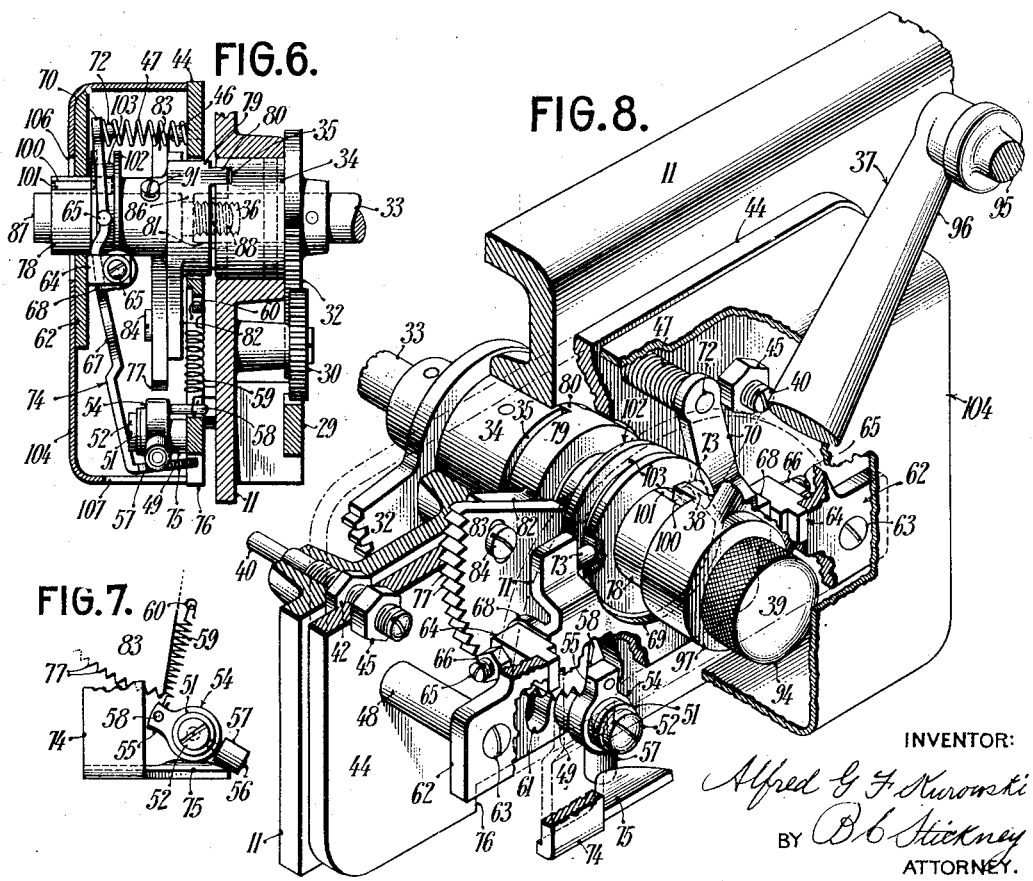
INVENTOR:
Alfred G. F. Kurowski
BY D. C. Stickney
ATTORNEY.

Patented Apr. 19, 1932

1,854,338

UNITED STATES PATENT OFFICE

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE

COMBINED TYPEWRITING AND COMPUTING MACHINE

Application filed June 30, 1928. Serial No. 289,385.

This invention relates to computing machines, and more particularly to a manually-operative full-stroke mechanism.

When using an electrically-driven Underwood combined adding and typewriting machine it sometimes happens that the electric current is shut off. It has been usual at such times to operate the machine by a handle. In so doing many errors may result. To avoid errors, this invention insures a full-stroke in both the forward and rearward movements of the handle.

When using this invention the handle is not attached direct to the general operator-shaft, but functions through an intermediate device. To this device the handle may be quickly attached when required, and also may be as readily removed when not needed. The device itself is easily attached to the adding machine, and readily becomes operable or inactive as required. It not only insures an errorless operation of the adding machine but also incorporates other advantages. It is not unduly expensive, is not unsightly, and requires no expert mechanic to install.

A feature of this invention is the provision of such an aforementioned unit that can be selectively used to actuate and control certain parts of an adding machine, when said parts cannot be operated by an electric motor.

Another feature is the use of an actuating handle which when attached makes the unit operative, and which when detached both stops and silences it.

Another feature is the additional use of tapped holes already in the machine-casing, as a means for attaching the unit.

Another feature is the embodiment of means whereby two shafts are unified, and one is thereby made operable within the unit.

Other features and advantages will hereinafter appear.

In the accompanying drawings,

Figure 1 is a sectional side elevation of parts of a combined typewriting and adding machine, showing the full-stroke unit attached to the right side.

Figure 2 is a side elevation of a segmental driving gear, pinion, and rack in connection with the ratchet-wheel, pawl, and detachable handle, as positioned when the handle is at the forward end of its stroke.

Figure 3 is a similar view to Figure 2, with an upper rack, pinion, and dial-wheel added, and with the parts positioned as the handle passes from front to rear. It shows the pawl in engagement to prevent a forward movement of the handle.

Figure 4 is a side elevation of the full-stroke unit with parts broken away, and with the handle in normal rearward position.

Figure 5 is a vertical section looking from rear to front, and showing the full-stroke unit in operative connection with parts of the adding machine. It shows a cam disengaged from the pawl by the attachment of the handle, leaving the pawl operative to engage the ratchet-wheel.

Figure 6 is a similar view to Figure 5, but showing the handle removed, which allows the cam to hold the pawl away from the ratchet-wheel and leave the machine free for electrical operation.

Figure 7 is a detail of parts shown in Figure 6, and shows the cam holding the pawl away from the ratchet-wheel, thereby silencing the pawl.

Figure 8 is a perspective view with parts broken away, and showing in detail one of the studs which attaches the unit to the machine.

The drawings disclose a typewriting machine having a frame-work 10, mounted on a computing mechanism, included in a casing 11. Numeral-keys 12, on levers 13, operate bell-cranks 14 to actuate type-bars 15. On levers 13 are stems 16 which are connectable with linkages 17 to depress pins 18 carried by bars 19. The latter are reciprocable and have racks 20 meshing with pinions 21 to operate dial-wheels 22. Other parts (not shown) successively lift the bars 19 so the pins 18 may be set by the linkages 17.

After the pins are set, a lever 23 can raise a pin 24 in a clutch casing 25, which releases a trip 26. This throws into operation a clutch (not shown) operated by a motor (not shown) which reciprocably actuates a knuckle 27 in a yoke 28 secured on a sliding rack 29, meshing with an idle pinion 30. The racks 29 are connected by a cross-bar 31, which in forward movement engages the pins 18 and drives the bars 19 to turn the dial-wheels 22. Another cross-bar (not shown) will return all the bars 19 to rearward position. In mesh with pinion 30, is a segmental gear 32, pinned on a shaft 33, carrying an attached head 34, having slots 35. The end of shaft 33 is tapped as at 36 for the attachment of a crank-handle 37, having keys 38, by means of a thumb or jack screw 39.

When the handle has been attached as last mentioned, it is possible to manually operate the computing mechanism in alternate directions. In so doing, however, there is nothing to insure that a full-stroke will be made by the handle in either direction. If this is not done, the numeral-keys and the dial-wheels will not co-ordinate to give correct computations, and possibly costly errors may result. An object of this invention is to prevent such errors, by the attachment of a full-stroke device.

In applying this full-stroke device to an adding and typewriting machine, it is attached to the right side of casing 11 by means of three slotted studs 40, as shown in Figures 4 and 8. These studs are already incorporated in the casing, for a usual usage, and supplant former pivot-screws. The studs are long enough to project outwardly from the casing and are partly threaded into the latter. These threads permit adjustment of the pivot points of the studs inside of the casing. The studs are adjustable through their heads, and are fixed by lock-nuts 42. When not covered by a full-stroke unit 43, the heads of these studs may be covered by cap-nuts.

The three studs 40 register with three holes in a rectangular bed-plate 44, forming part of the unit 43 which can be set over the studs. Owing to the spacing of said studs and holes, the unit can be so placed in only one position. This permits the handle 37 to lie at an angle most convenient for operation, as will appear. When placed, the bed-plate 44 is fastened by nuts 45 on studs 40. The lock-nuts 42 also act as spacers to give clearance to any projecting parts of plate 44. On the latter also are an anchor stud 46 for a coil-spring 47, and three attached posts 48. Also attached to the bed-plate is a stud 49 formed with two shoulders, from one of which is a projection passed through the plate and riveted.

The stud 49 is reduced for a washer 51, held thereon by a screw 52, and includes a bushing 53 for a pawl 54, having a projection or head 55 formed with square corners. The latter can alternately function as detents or back-checking pawls when in engagement with a reciprocating ratchet-wheel. The pawl also has a pin 56 carrying a roller 57. Another pin 58, in the head 55, holds a contractile spring 59 whose other end is hooked through a hole 60 in the bed-plate 44. Both the pin 58 and the spring 59 have clearance to swing in a cut-out 61 in the bed-plate, and normally hold the pawl transversely of latter. This invention, however, is not limited to the use of the spring shown, as another form may be substituted.

On the three posts 48 rests a super-plate 62 parallel to the bed-plate, and held by counter-sunk screws 63. The super-plate near each end has a permanently-attached square post 64 extended toward the bed-plate. Each post 64 is tapped longitudinally of the plates for the reception of a pivot-screw 65, carrying a lock-nut 66. The pivot-screws are adjustable in order to center a rock-plate 67 which they abut and support through ears 68 bent at a right angle to the plate.

Along an edge paralleling its axis, the rocking-plate 67 has a J-shaped cut-out 69, leaving a long arm 70 and a short arm 71. Arm 70 affords a leverage for the coil-spring 47 which is positioned by an anchor-stud 72 carried by the arm. The arm 71 is made short to reduce weight and to help counterbalancing of the plate. Each arm carries a fixed stud 73 set on a common axis which parallels the axis through the ears 68. So set, the studs can function as levers to slide a collar which they engage and which will hereinafter be described.

Extending from the rocking-plate and oppositely to the arm 71, is a tail-piece 74 which is both bent and offset from the plane of the arms to insure clearance. The free end of the tail-piece is formed with a lateral projection, and is then bent to an obtuse angle. The projection is formed into an exterior double cam 75, as best shown in Figure 8. This cam is shown integral but may be separate and be attached by screws or rivets. This cam, when in engagement with the pawl-roller, has a clearance provided through a cut-out 76 in the bed-plate 44.

Extending through and at right angles to the afore-mentioned plates, is a stub-shaft 78 having a head 79 which may be integral or attached. This head is faced and planed to leave projecting keys 80 lying on diametrically-opposite sides of a centrally bored end hole 81. The keys 80 fit into the key-slots 35 of the head 34 on the general operator shaft 33, the end of which will then be in the hole 81.

Also carried by the head 79, is a laterally-projecting and segment-shaped arm 82, which may be integral or attached. This arm 82 carries a segmental ratchet-member 83 having teeth 77 which function with the pawl head 55. The ratchet-member 83 is attached to the arm by screws 84 through circumferential slots 85. These permit relative adjustment between pawl 54 and ratchet-member 83, when the latter is unified with other stroke-limiting means.

The stub-shaft 78 is further bored axially to two diameters leaving an internal collar 86, against which can abut a shoulder of a stud 87. The latter is turned down and threaded at one end, as at 88, so that it may be passed through the collar 86 and be set up in the threaded hole 36. For turning the stud in the threads, an opposite end has key-slots 89, Figure 4. At the slotted end the stud is tapped, as at 90, for the reception of the thumb-screw 39. For holding the stud in the stub-shaft 78, there is a set-screw 91. When the keys 80 are engaged by the slots 35 and the stud 87 has been set up in shaft 33, the two shafts will be unified. The floating sub-shaft thereupon becomes fixed to operatively function with other parts of the unit.

The thumb-screw 39 is formed with an upset threaded end which can alternately engage either the threaded holes 36 or the hole 90. A shank 92, of smaller diameter, extends back to a hub 93 on a large knurled head 94. The hub can abut a smoothed outer surface of the crank 37 and at the same time provide space between the latter and the knurled head. Such space is provided to give clearance to the head over any small protuberances on the cast metal crank. Also, such spacing will prevent marring of the finish on the latter.

The crank 37 has a handle 95 which may be separate or integral with its shaft or lever 96 and its head 97. The latter, on the face opposite the handle, is planed to leave diametral keys 38 which are separated by a central hole 98 which can fit over the slotted end of the stud 87. The hole 98 is shallow enough to leave a wall 99 which is bored axially and tapped to fit the upset threaded end of the thumb-screw 39. The latter, when passed through the wall, will be loosely held thereby, and will not be readily separable and become lost. Also, the threads on the screw can then be readily rotated for engagement with the threaded end of the stud.

Cut diametrically through the walls at one end of the stub-shaft 78, are slots 100. These slots can engage the keys 38 of the crank 37, which may then be so fixed by its thumb-screw. The keys 38 can then abut two lugs 101 which slide in said slots. Each lug is attached to an opposite side of a hole through a collar 102 which can slide along as well as rotate with the stub-shaft. The collar has an annular channel 103 into which project the two studs 73 of the rocking-plate 67. From this description may be noted that the slots 100 serve a dual purpose.

A stamped metal cover 104 is provided which can rest on, or overlap, the edge of the bed-plate 44. The cover is held by screws (not shown) which attach it to the super-plate 62, through oppositely-located holes 105. The cover also has a cut-out 106 for the crank-hub or head 97 and may have an embossing or cut-out 107 to give clearance to the pawl-roller 57. This cover is lacquered to match the finish of the machine so the unit will not detract from the appearance of the latter.

In utilizing the full-stroke device, it is attached as before described, but without its handle, to a combined adding and typewriting machine. When so attached its parts may lie as shown in Figure 6. In such positions the parts are most advantageously related for an electrical operation of the machine. When so operated the machine uses self-contained means which function to give the correct travel to the reciprocating racks 20. The limiting means of the full-stroke device are therefore not needed. As such means are constituted in the ratchet-wheel and pawl when in engagement, a provision is made for holding the pawl away from its wheel.

The primary means that disengages the pawl is the double cam 75 which can be actuated to force the cam-roller to one side or the other. The two cams are necessary because one acts when the pawl rests, as in Figure 3, and the other when the pawl has swung 90 degrees, to the position, as drawn. The cam occupies the position shown in Figures 6 and 7, because of the tension in the expansion spring 47 exerted against the opposite end of the plate which carries the cam. This plate is free to rock on its pivots 65, and, as shown by Figure 6, has caused its co-ordinating collar 102 to abut the super-plate 62. So positioned, the lugs 101 have slid along the slots 100 to rest at the end of the stub-shaft 78.

With the parts positioned as described in the last two paragraphs, all component parts of the stub-shaft are free to reciprocate with the general operator shaft 33. Therefore, the computing mechanism is left free to be operated by an electric motor, and the click of the ratchet-wheel and pawl is silenced. When the machine can be operated electrically, the full-stroke attachment, of course, is not needed. It is a means, however, that can instantly be operable when required and thereby does constitute an advantage.

When desirable to manually operate the computing machine, the handle is attached to the full-stroke device which positions the parts as best shown in Figure 5. Herein, the thumb-screw has been set up in the stub-shaft 78, whereby the keys 38 have entered the slots 100 and forced therealong the sliding lugs 101. These in turn have pushed along the attached collar 102 the annular channel in which engages the studs 73, through which the plate 67 has been rocked. Such rocking compresses the spring 47 and disengages the cam 75 from the pawl-roller 57.

When the roller 57 is released by the cam, the pawl is swung by its spring 59 to assume a transverse position as shown in Figures 1, 2, 4 and 8. So positioned, the pawl-head 55 will lie within the circumferential path of the ratchet-wheel in a position relative to the latter, as shown by Figure 4. When the handle is brought forward, the teeth of the wheel will strike the pawl-head 55 and swing it to the right. The spring 59 thereafter holds the pawl in successive engagement with the teeth as they pass by. While so engaged the teeth cannot be moved in a reverse direction through the well-known holding action of the pawl.

Before the handle can be swung rearwardly, a full forward stroke must be completed which permits the ratchet-wheel and pawl to assume the relative positions shown in Figure 2. A rearward motion of the handle then swings the pawl-head to the left, as shown by Figure 3, wherein it again functions to prevent a reverse movement of the handle. The segmental ratchet-wheel and pawl, therefore, function to insure a full-stroke to the handle when swung in either direction. Therefore, the general operator will complete its cycle of operations, and errors are prevented.

When the handle is attached, as shown, its weight is partly counterbalanced by the weight of the segmental gear 32, the arm 82 and the ratchet wheel 83. This is an advantage, should the machine for any reason be operated electrically, while the handle is still in place on the attachment. In such case, the handle might not be an advantage, but would not prevent electrical operation. Therefore, should an operator forget to remove the handle, no harm is done to the machine. Another advantage of the full-stroke device is that it spaces the handle further from the casing. An operator's knuckles, therefore, are not apt to be barked by the typewriter-frame when reaching for the handle.

Variations may be resorted to within the scope of the invention, and portions of the improvements may be used without others.

Having thus described my invention, I claim:

1. In a machine of the class described, having a computing mechanism, a driving shaft therefor and a crank for driving said shaft, the combination of means effective to ensure a full stroke of said crank in driving said shaft and computing mechanism, including a shaft-lengthening stud, a hollow stub-shaft mounted upon said stud and connected to said driving shaft, a ratchet-toothed segment fast to said stub-shaft, a pawl pivoted on a frame of the machine and spring engageable with said toothed segment, a lever normally controlling said pawl, a collar slidable along said stub-shaft, and connected to one end of said pawl-controlling lever, a spring effective to control the effective position of the lever and the ineffective position of the pawl, and means rendered effective while the crank is assembled upon the shaft-lengthening stud, to slide the collar along said stub-shaft to vibrate the pawl-controlling lever and release the pawl for spring engagement with the toothed segment to ensure a full stroke for the sweep of the shaft-driving crank.

2. In a machine of the class described, having a computing mechanism, a driving shaft therefor and a crank for driving said shaft, the combination of means effective to ensure a full stroke of said crank in driving said shaft and computing mechanism, including a shaft-lengthening stud, a hollow stub-shaft assembled over said stud and having an end clutchable with the crank, a ratchet-toothed segment fast to said stub-shaft, a pawl pivoted on a frame of the machine and spring engageable with said toothed segment, a lever normally controlling said pawl, a collar slidable along said stub-shaft, and connected to one end of said pawl-controlling lever, a spring effective to control the effective position of the lever and the ineffective position of the pawl, and means rendered effective while the crank is assembled upon the shaft-lengthening stud and into clutching engagement with the stub-shaft, to slide the collar along said stub-shaft to vibrate the pawl-controlling lever and release the pawl for spring engagement with the toothed segment to ensure a full stroke for the sweep of the shaft-driving crank.

3. In a computing machine, the combination with a main operating shaft having a motor, of connectible manual means to operate said shaft independently of the motor, said manual operating means including an extension secured to the end of the main operating shaft and a crank-arm secured to the extension, said manual operating means including also a lengthening stud secured to the end of the main shaft, a crank-arm connectible with said stud, and a full-stroke device operable on the stud, said full-stroke device including a sector on the stud and a co-operating pawl on the frame of the machine, and means to disable the pawl when the crank-arm is detached from the stud.

4. In a computing machine, the combination with a main operating shaft having a motor, of connectible manual means to operate said shaft independently of the motor, said manual operating means including an extension secured to the end of the main operating shaft and a crank-arm secured to the extension, said manual operating means including also a lengthening stud secured to the end of the main shaft, a crank-arm connectible with said stud, and a full-stroke device operable on the stud, said full-stroke device including a sector on the stud and a co-operating pawl on the frame of the machine, and means to disable the pawl when the crank-arm is detached from the stud, said disabling means including a lever having a cam at one end and a spring at the other end operable to swing the cam into engagement with the pawl and swing the pawl out of co-operation with the sector.

5. In a computing machine, an operating shaft combined with alternative shaft-operating mechanisms, including a handle and a motor, a shaft-extension for the handle, a full-stroke device for the shaft-extension including a ratchet and a pawl, the handle being removable when it is desired to drive the shaft by the motor, and means dependent upon removal of the handle for disabling the full-stroke device.

6. In a computing machine having a main operating shaft and a motor, the combination of manual means to operate said shaft independently of the motor, including an extension for the shaft and a crank-arm attachable to the extension, and a full-stroke mechanism for said manual operating means, including a sector on the extension and a pawl brought into co-operation with the sector by the movement of the attached crank-arm along the extension.

7. In a computing machine of the class described, having a motor and a shaft, the combination of a shaft-elongating stud attached to said shaft, a stub-shaft member supported upon said stud, to rock said shaft, a full-stroke device including a ratchet-member carried by said stub-shaft, a pawl pivoted to engage said ratchet-member, and an operating crank connectible to the outer end of said stud to operate said stub-shaft and rock said shaft, said operating crank having sliding connections to swing said pawl into engagement with said ratchet-member to control the full sweep of said crank.

8. In a computing machine of the class described, having a motor and a shaft, the combination of a shaft-elongating stud attached to said shaft, a stub-shaft member supported upon said stud, to rock said shaft, a full-stroke device including a ratchet-member carried by said stub-shaft, a pawl pivoted to engage said ratchet-member, an operating crank connectible to the outer end of said stud to operate said stub-shaft and rock said shaft, said operating crank having sliding connections to swing said pawl into engagement with said ratchet-member to control the full sweep of said crank, said sliding connections including a collar loose upon said stub-shaft, means carried by the crank to slide upon the stub-shaft to move said collar, and means forming a part of said pawl and engageable by the collar to disable the pawl from the ratchet-member.

9. In a computing machine having an extended machine-operating shaft operated by a motor and by a crank-arm alternatively, the combination of a full-stroke device for the shaft including a sector on the shaft to be driven by both the motor and by the crank-arm, a pawl on the frame controlled by the crank-arm and operative to engage the sector when the crank-arm is to drive the sector, and means dependent upon the removal of said crank-arm for silencing said pawl.

ALFRED G. F. KUROWSKI.